United States Patent
Chen et al.

(10) Patent No.: US 8,595,287 B2
(45) Date of Patent: Nov. 26, 2013

(54) METHOD AND APPARATUS FOR METADATA DRIVEN WEB SERVICE MEDIATION

(75) Inventors: Ying Chen, Beijing (CN); Fang Xing, Beijing (CN); Liang-Jie Zhang, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 962 days.

(21) Appl. No.: 12/053,012

(22) Filed: Mar. 21, 2008

(65) Prior Publication Data

US 2008/0168150 A1    Jul. 10, 2008

Related U.S. Application Data

(63) Continuation of application No. 11/105,525, filed on Apr. 14, 2005, now abandoned.

(51) Int. Cl.
G06F 15/16    (2006.01)
G06F 15/173    (2006.01)

(52) U.S. Cl.
USPC ............................ 709/203; 709/224; 709/227

(58) Field of Classification Search
USPC .................................................. 709/203
See application file for complete search history.

(56) References Cited

U.S. PATENT DOCUMENTS

| | | | | |
|---|---|---|---|---|
| 7,634,759 B2 * | 12/2009 | Calsyn et al. | ................ | 717/124 |
| 7,702,724 B1 * | 4/2010 | Brydon et al. | ................ | 709/203 |
| 7,707,564 B2 * | 4/2010 | Marvin et al. | ................ | 717/140 |
| 2002/0184401 A1 * | 12/2002 | Kadel et al. | ................ | 709/315 |
| 2003/0074357 A1 * | 4/2003 | Nielsen et al. | ................ | 707/9 |
| 2003/0081791 A1 * | 5/2003 | Erickson et al. | ................ | 380/282 |
| 2003/0217044 A1 | 11/2003 | Zhang et al. | | |
| 2004/0123109 A1 * | 6/2004 | Choi | ................ | 713/176 |
| 2005/0160088 A1 * | 7/2005 | Scallan et al. | ................ | 707/3 |
| 2005/0262194 A1 * | 11/2005 | Mamou et al. | ................ | 709/203 |
| 2006/0004830 A1 * | 1/2006 | Lora et al. | ................ | 707/102 |
| 2008/0010664 A1 * | 1/2008 | Pelizza et al. | ................ | 725/134 |
| 2008/0086564 A1 * | 4/2008 | Putman et al. | ................ | 709/227 |

* cited by examiner

Primary Examiner — Richard G Keehn
(74) Attorney, Agent, or Firm — Whitham, Curtis, Christofferson & Cook, P.C.; Daniel P. Morris

(57) ABSTRACT

A mechanism lets a service consumer add mediation metadata in a Simple Object Access Protocol (SOAP) message and lets a service provider perform server side mediation based on the pre-defined mediation metadata. A client side mediation engine is plugged into a client SOAP engine. When the client side mediation engine receives a request message from the client SOAP engine metadata is attached to a message header of a SOAP message and returned to the client SOAP engine. A server side mediation engine is plugged the server side mediation engine receives a SOAP message from the server SOAP engine, metadata is mapped with an appropriate adaptor and returned to the server SOAP engine.

13 Claims, 6 Drawing Sheets

METHOD AND APPARATUS FOR METADATA DRIVEN WEB SERVICE MEDIATION

CROSS-REFERENCE TO RELATED APPLICATIONS

This application is a continuation of U.S. patent application Ser. No. 11/105,525, filed Apr. 14, 2005, now abandoned, and which is incorporated herein by reference.

BACKGROUND OF THE INVENTION

1. Field of the Invention

The present invention is directed to a method and apparatus for inserting mediation metadata into a Simple Object Access Protocol (SOAP) message based on existing Web service client engine.

2. Background Description

Web Services (WS) are being considered an excellent technology to achieve business integration. Many companies are putting effort on integrating internal and external application and resources by Web Services.

Web Services involve a family of related protocols to describe, deliver, and interact with services. This family can be further subdivided into groupings based on common functions and uses. The first group handles the issues of messaging, interface description, addressing and delivery. The most well-known is the messaging protocol known as Simple Object Access Protocol (SOAP). This protocol encodes messages so they can be delivered over the network using a transport protocol such as Hypertext Transfer Protocol (HTTP), Internet Inter-Orb Protocol (IIOP), Simple Mail Transfer Protocol (SMTP), or others. The Web Services Description Language (WSDL) is represented as a series of eXtensible Markup Language (XML) statements that constitute the definition for the interfaces of each service. The Universal Description, Discovery and Integration (UDDI) protocol defines a registry and associated protocols for locating and accessing services. Web Service Policy (WS-Policy) provides a general purpose model and syntax to describe and communicate the policies of a Web service.

Although there are many specifications on Web Services, there are still many problems to be solved when putting Web Services into practice. Web Services are published for consumer invocation. Different consumers have different requirements, both functional and non-functional. But there is no way for a consumer to negotiate with a Web Service to customize the Web Service at runtime. The interaction between service provider and service consumer is SOAP message exchange. Customization of a Web service is equal to customizing SOAP message structure and content. Current Web Services engines can not provide such capabilities. Some examples are described below.

The SOAP body can not be customized. If a consumer and a service have different data schema, transformation on the SOAP body must be performed between the consumer and the service. For example, a travel agent application requests a train list by invoking a train query service. The query service has an operation named "GetAllTrains", whose return type is "AllTrains". But the travel agent uses a Train List, which is different from a Ticket. So a data mapping should be put into the server side or the client side. Under most conditions, the server would not provide an additional method or mapping handler for the individual consumer. That means the consumer should adapt itself to the service, or the mapping work is always done a the consumer side. This solution is not good enough under some conditions, such as when the consumer has a poor computation resource, or the consumer does not know how to perform Such a transformation.

The message content can not be filtered. A consumer can not selectively retrieve an invocation result. For example, "AllTrains" will be returned by the service, but "AllTrains" is a large record, which contains detailed information of each train, while the consumer only needs the train number of each train. Transferring unnecessary data will not only cost network resources, but also increase overhead on data serialization and deserialization.

The security policy can not be changed according to the customer's requirements. The security policy is claimed using WS-SecurityPolicy. It could be retrieved by the consumer using WS-MetadataExchange at runtime or from the WSDL document which has the WS-Policy attached at design time. Then the consumer could construct a SOAP request following the security policy. This mechanism lacks the flexibility of constructing the SOAP invocation message. First of all, the service can not provide multiple policies so the client can not select a policy. All consumers must share the same security policy, which is configured statically. On the other hand, the client can not change the policy. For example, a train query service does not define the security policy, but an agent wants the result message to be encrypted. It is impossible to achieve such encryption without configuring the service.

In current solutions, the service provider needs to take great effort in changing the security policy, adding a transformation handler and employing a filtering method for different consumers.

Some solutions have been proposed to address some of these issues. U.S. Patent Application Publication No. 20030217044 A1 provides a solution to automate a method signature adaptation for dynamic web service invocation. It adds a MetaWSDL to each service. MetaWSDL is an XML presentation to describe a MetaObject. By adding this semantic information, different input messages could be transformed to messages conforming to WSDL of service. This method requires changes at the client side, at the UDDI server and at the service provider side. The method could only change parameter types of Web service methods. Security policy changing and SOAP response filtering can not be performed. Moreover, the method presented in U.S. Patent Application Publication No. 20030217044 A1 does not use the SOAP header to carry the MetaWSDL, which is grouped with a corresponding WSDL document in a WSIL (Web Services Inspection Language) document.

A Web service gateway provides the ability to transmit a SOAP message. It acts as a mediator between the service provider and the service consumer. The main value of the gateway is to have a central control point on distributed services. Transformation and filtering could be done only by adding handlers which need additional development work.

SUMMARY OF THE INVENTION

In view of the foregoing problems, it is therefore an object of the present invention to provide a method of attaching mediation metadata in a SOAP message.

Another object of the invention is to provide a mediating SOAP message based on the metadata in the SOAP message.

The invention accomplishes these objects by mapping metadata with appropriate adaptor(s). Therefore, a further object of the invention is to provide a method of implementing a transformation adaptor and constructing transformation metadata.

Further objects of the invention are the provision of methods of implementing a filtering adaptor and constructing filtering metadata.

Still other objects of the invention are the provision of methods of implementing a security adaptor and constructing security metadata.

These and other objects of the invention are accomplished with an apparatus which inserts mediation metadata into a SOAP message based on existing Web service client engine.

Current Web service metadata is always statically defined, such as WSDL and WS-Policy. The statically defined metadata provide a foundation for interaction. In order to achieve some flexibility for Web Services, the present invention provides a mechanism to add metadata into the header of each request SOAP message, so metadata driven mediation can be executed on the server side for each SOAP message. Mediation means are provided for modifying format and/or content of a message. By using mediation, a consumer and a provider, each with different data schema and security policies, can be linked together. Using metadata provided by the consumer, the service provider can understand the consumer's requirement on mediation.

The advantages of the present invention are:

1) Improved service flexibility and adaptability, and reduction in management cost. Once a service provider publishes a service, the service management work begins. The management cost could be very high, because there are many requirements from different consumers on security policies, method signature, and data filtering. All these have nothing to do with service implementation. So one possible result is that the administrator keeps on adding different adaptor services or wrapper services for a same service implementation, fulfilling the consumer's needs. Some of the requirements are short-lived or even one-off. It will be a management nightmare for the service administrator. The biggest advantage of the present invention is that it enables the service consumer to customize each invocation without service administrator's involvement. The integration lifecycle is shortened greatly.

2) Improved performance of service invocation. Service consumers of a same service may have different requirements on content of an invocation result. Unnecessary data transfer and serialization will happen for some consumers. This will significantly increase overhead and greatly harm invocation performance. For consumers that have limited resources, it will be even worse because data needs to be transformed before it cam be utilized. The present invention provides a mechanism to enable server side mediation. Lots of work can be done on the server side. This reduces the consumer's processing time and eliminates unnecessary network traffic.

3) Simplified service definition. The present invention enables the consumer to claim requirement on demand. The service provider can pay less attention on how the consumer will invoke the service. For example, there is no need to provide same service functionality with different method signatures. Only one method is needed for one function. The service can keep concision, and the consumer will be also satisfied because no judgment will be made on which method should be used especially when there are multiple similar methods.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
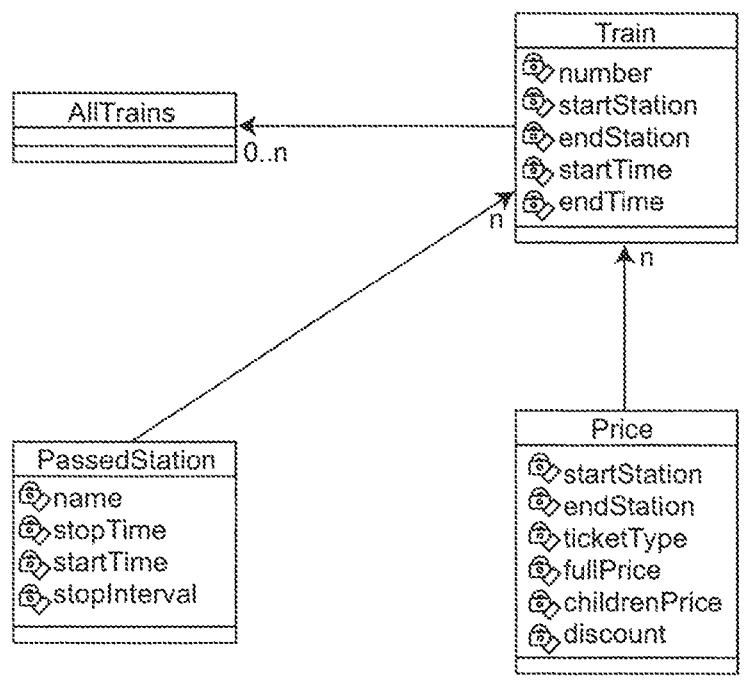
FIG. 1 is a diagram illustrating a sample data schema.

Before describing the preferred embodiment of the invention, the following background knowledge is required by way of introduction. EXtensible Stylesheet Language Transformation (XSLT) is a language for transforming XML documents into other XML documents. XSLT can also add new elements into the output file, or remove elements. It can rearrange and sort elements, and test and make decisions about which elements to display, and a lot more. It became a World Wide Web Consortium (W3C) Recommendation on Nov. 16, 1999.

A transformation expressed in XSLT is called a stylesheet. A stylesheet is also an XML document. A stylesheet contains a set of template rules. A template rule has two parts: (1) a pattern which is matched against nodes in the source tree and (2) a template which can be instantiated to form part of the result tree. The transformation engine has two inputs: (1) a stylesheet document and (2) a source XML document. After the engine's processing, the result document will be generated.

XQuery is a language flexible enough to query a broad spectrum of XML information sources, including both databases and documents. XQuery operates on the abstract, logical structure of an XML document, rather than its surface syntax. This logical structure is known as the data model. XQuery allows both specifying what will be found and designating what its output format should look like in the same query.

The goal of WS-Security is to enable applications to construct secure SOAP message exchanges. WS-Security is flexible and is designed to be used as the basis for the construction of a wide variety of security models including Public Key Infrastructure (PKI), Kerberos, and Secure Sockets Layer (SSL). Specifically, WS-Security provides support for multiple security tokens, multiple trust domains, multiple signature formats, and multiple encryption technologies. WS-Security provides three main mechanisms: (1) security token propagation, (2) message integrity, and (3) message confidentiality. These mechanisms can be used independently (e.g., to pass a security token) or in a tightly integrated manner (e.g., signing and encrypting a message and providing a security token hierarchy associated with the keys used for signing and encryption).

The present invention provides a mechanism to let a service consumer add mediation metadata and let a service provider perform server side mediation based on the pre-defined mediation metadata.

Three types of mediations are provided in the present invention:

1) Transformation. In existing solutions, a consumer knows the data schema of the service by retrieving WSDL. The message sent or received by the consumer must conform to the data schema definition. If the consumer uses a different data model inside a consumer application, the consumer must transform input and output SOAP messages. This transformation could produce some overhead. When the consumer's computation resource is limited, such as a mobile device, the service invocation performance may be a problem. Under such a condition, the server side mediation could be a help. Existing solutions always use a statically configured handler or hard-coded adaptor to achieve the server side transformation. When a consumer comes with a different data schema, a new adaptor needs to be developed. In the present invention, the server side transformation is not hard coded. A transformation metadata will be attached onto the SOAP message. The metadata contains all the necessary information about transforming between a consumer XML document and a provider XML document. A server side transformation engine transforms the message based on the metadata. The transformation is controlled by the consumer using metadata. Different consumers can attach different metadata.

2) Filtering. At Web Service design time. Some filtering method may be considered and added as a Web service operation, but it is not possible that all the possible filtering methods could be covered. When a service is published, different requirements associated with a consumer will arise. For example, FIG. 1 is the data schema of a result of a TrainQuery service. Some consumers may need detailed price and station information, while others only need startTime and endTime of the train. If there is no such method provided at design time, the present invention can perform server side filtering at runtime. There is no need to change service design. Every configuration is not needed. The filtering is totally based on XML processing. Filtering metadata is sent along with the message and passed to the XML filter.

3) Security policy customizing. Web service security does not support customization or negotiation. Service could be published along with its security policy. Based on this policy, a consumer could make necessary encryption, add signature or identification. In the present invention, the consumer can assign the desired security policy which is different from the published security policy. This is useful in a dynamic environment, which needs flexibility in terms of message level security enablement. The security metadata contains preferred security policy and corresponding algorithm. The server can apply this customized policy dynamically for processing the incoming SOAP message.

In order to attach appropriate metadata with a SOAP request message, the consumer needs to build a configuration file or extend the Web Service's client deployment descriptor. This configuration contains the necessary metadata for service mediation. When a service is invoked, the Web Service runtime will investigate the mediation configuration and automatically attach metadata for each outgoing message. With a configuration file, there is no need to change the client programming model for invoking a Web Service.

This declarative solution is targeted for per-customer customization or mediation. For instance, each customer has one mediation policy. If per-call customization is needed, the consumer can use a program interface provided by the client mediation engine. Then the client can set a proffered mediation parameter for each call.

On the server side, a mediation engine is plugged into a SOAP engine. The mediation engine processes a SOAP message before and after service invocation. It analyzes the metadata type and dispatches the message to appropriate adaptors. Each adaptor will handle a kind of metadata.

There are three default adaptors that could enable transformation, filtering and security mediation. Other adaptors could also be installed, which would provide other mediation functionalities. Adaptors can be installed by service administrators directly, with required binary component and configurations. Adaptors can also be installed dynamically by a consumer. This type of adaptor does not have an implementation on the server. It is a specific Web Service. The adaptor will only be used for processing messages.

Figure 2:
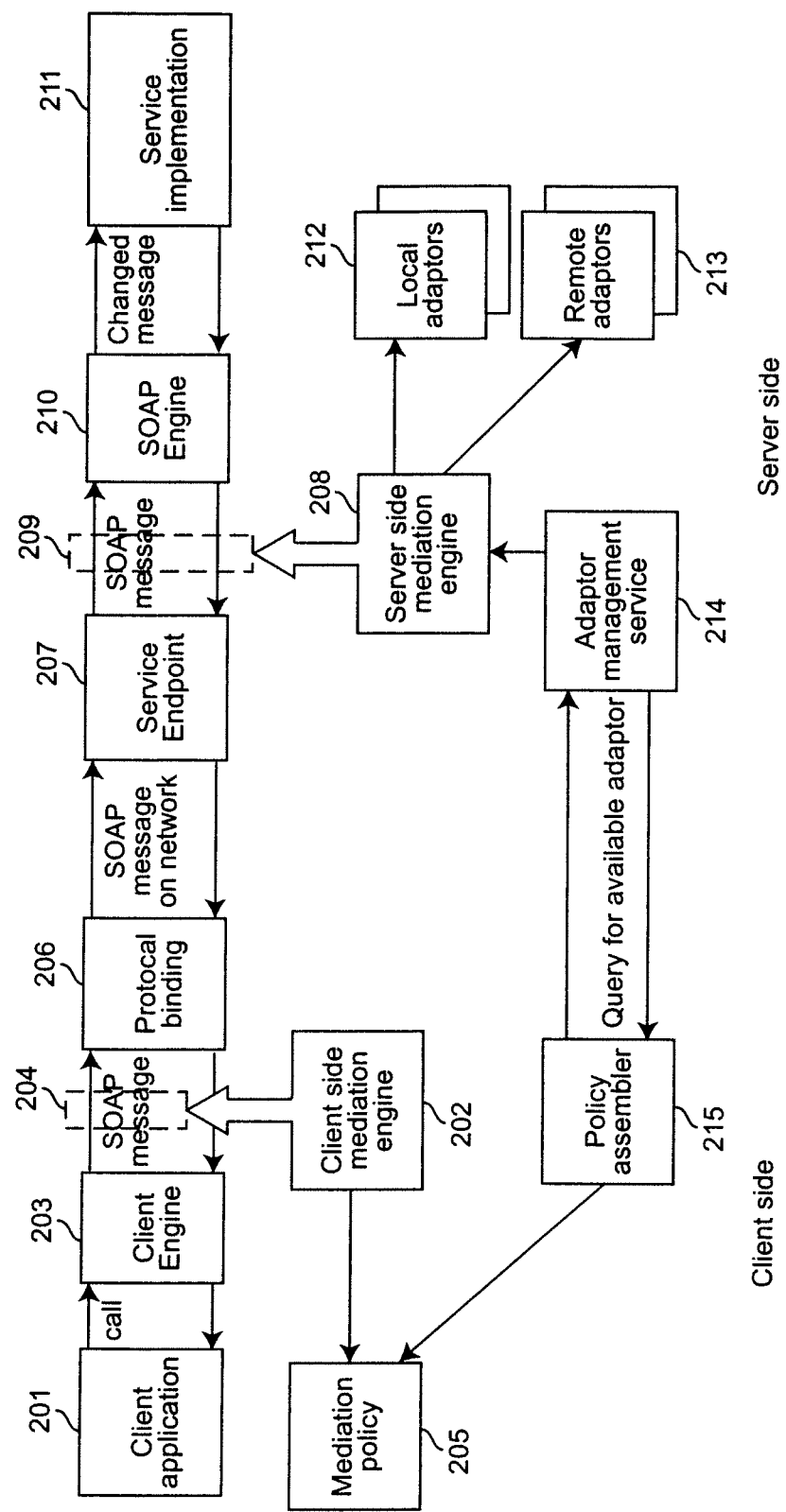
FIG. 2 is a block diagram illustrating an apparatus implementing the disclosed method according to the invention.

FIG. 2 is the apparatus of the present invention. The apparatus is based on an existing SOAP engine and client engine, such as Web Services invocation framework (WSIF). The components of the apparatus integrate with existing SOAP engine in a seamless manner. Only the least effort is needed to change an exiting Web Service stack. These components can be divided to two categories; one is for runtime mediation support, the other is for design time configuration or management support. There is also a difference on where to place the components. The components are distributed on both client side and server side.

More particularly, with reference to FIG. 2, the client side includes a client application 201 and a client side mediation engine 202. The client application 201 makes a call to a client engine 203 which generates a SOAP message 204. The client side mediation engine 202 consults a consumer mediation policy 205 and attaches transformation metadata to the SOAP message 204. The SOAP message 204 is then bound to a protocol (e.g., HTTP) in protocol binding 206 before being sent on the network.

Metadata will be presented in XML format and embedded in the SOAP header. The namespace for this metadata is http://www.wsmediation.com/metadata. The prefix is wsm. For a specific metadata type, another namespace could be defined. Following is an example SOAP message which contains mediation metadata.

```
<S:Envelope xmlns:S="http://www.w3.org/2003/05/soap-envelope"
 xmlns:wsm=" http://www.wsmediation.com/metadata"
 xmlns:wsmt="http://www.wsmediation.com/transformation"
 xmlns:wsmf="http://www.wsmediation.com/filtering"
 xmlns:wsms="http://www.wsmediation.com/security"
 xmlns:wsse="http://schemas.xmisoap.org/ws/2002/12/secext"
 xmlns:wsp=" http://schemas.xmisoap.org/ws/2002/12/policy">
<S:Header>
<wsm:transformation>
<wsmt:instylesheet url="http://www.example.com/in.xsl"/>
<wsmt:outstylesheet url="http://www.example.com/out.xsl"/>
<lwsm:transformation>
<wsm:filtering>
<wsmf:expression url="http://www.example.com/xquery.exp"/>
</wsm:filtering>
<wsm:security>
<wsse:Integrity wsp:Preference="..." wsp:Usage="...">
<wsse:Algorithm Type="..." URI="..." wsp:Preference="..."/>
</wsse:Integrity>
</wsm:security>
</S:Header> <S:Body>
</S: Body> </S:Envelope>
```

In the metadata assertion, there are multiple namespaces. wsmt, wsmf, wsms are three mediation namespaces, which indicating the type of the metadata is for transformation, filtering or security mediation purpose. wsse and wsp comes from WS-Security and WS-Policy specification, which indicating the metadata is conforms to these standards.

The following describes the attributes and elements listed in the schema overview above:

/wsm:transformation.

This presents the element containing metadata for transformation. In this element, some elements with namespace "wsmt" could be defined. The wsmt element is targeting for defining transformation specific parameters.

/wsmt:instylesheet

This element contains the style sheet for input message transformation. The style sheet could be claimed in the element body.

/wsmt: instylesheet@url

There is another way to provide style sheet. This attribute refers to a document on network. So the style sheet does not need to be transferred with SOAP message. This will make it possible to cache style sheet on server side. The caching mechanism is out of the scope of this invention.

/wsmt:outstylesheet

This is similar with /wsmt:instylesheet. It will be used for output message transformation.

/wsmt:outstylesheet@url

This is similar with /wsmt:instylesheet@url

/wsmt:{any}

This contains other information needed by transformation engine.

/wsm:filtering

This presents the element containing filtering metadata.

/wsmf:expression

This presents the element containing XML query expression.

/wsmf:expression@url

Query expression does not need to be transferred with SOAP message. It could be referred using a URL.

/wsmf:{any}

This contains other information needed by filtering engine.

/wsm:security

This contains security policy assertion. This assertion could be defined using WS-SecurityPolicy.

/wsm:{any}

This provides an extensible point to add other type of metadata for mediation purpose.

Referring again to FIG. 2, on the server side, the SOAP message is received at the service endpoint 207. A server side mediation engine 208 retrieves the transformation metadata from the SOAP message 209 before the SOAP message is input to the SOAP engine 210. The changed message is then input to the service implementation 211. The server side mediation engine 208 accesses local adaptors 212 and remote adaptors 213. The server mediation engine 208 is plugged into server side SOAP stack. The SOAP message is processed by mediation engine 208 before and after message is processed by service implementation 211. The mediation engine 208 does not change the SOAP message 209 directly; rather, it analyzes the type of metadata and forwards the SOAP message to a corresponding adaptor. The type of metadata will be identified by the element name, such as wsm:transformation, wsm:filtering and so on.

There is a configuration file recording the mapping between the metadata type and the adaptor. The configuration file is like this:

```
<adaptor name="transformation">
<namespace>http://www.wsmediation.com/transformation</namespace>
<local>com.wsmediation.com.TransformationAdaptor</local>
<remote type="Web service">http://192.168.1.1:80/transform</remote>
</adaptor>
```

In the configuration, the namespace is used to identify the metadata type contained in the incoming message. If the metadata type in the message matches the adaptor namespace in the configuration file, a local adaptor 212 defined in local element will be invoked. If no local element is defined, then a remote adaptor 213 will be invoked. The remote adaptor could be a Web Service, an Enterprise Java Bean (EJB) or other components. In the current example, a remote Web Service is defined. The endpoint for the service is http://192.168.1.1:80/transform.

For each message, multiple adaptors could be invoked in order. The order of processing is based on the appearance order of metadata in the incoming message. For example, if the incoming message is like

```
<wsm:transformation>
...
</wsm:tra nsformation><wsm:filtering>
...
</wsm:filtering>
``` then the transformation adaptor will be invoked first for incoming message, and then the filter adaptor. For an output message, the order is reversed.

As indicated in FIG. 2, the adaptor could be implemented as a local component, local adaptors 212, or a remote service, remote adaptors 213. Adaptors are used to handle messages. Each adaptor must expose the following interface definition:

```
Interface Adaptor {
    SOAPMessage handleIncoming(MessageContext context,
    SOAPMessage message);
    SOAPMessage handleOutcoming(MessageContext context,
    SOAPMessage message);
}
```

The two methods are used to handle the incoming request and outgoing response, respectively. For each method. SOAPMessage is the data structure holding in-memory an XML document. MessageContext is the data field holding temporary data. For example, an adaptor could put some properties in the MessageContext, so the next adaptor could acquire these properties by reading MessageContext.

A transformation adaptor performs SOAP body transformation. Two transformations will happen; first, after a message is received and, second, before a message is sent. To transform a message, the adaptor needs to know how to transform the message. Transformation metadata contains a style sheet, which can be utilized by the adaptor. The commonly used XML transformation processor, XSLT engine, can be used in a specific implementation of the invention. Other XML processors could also be used.

The filtering adaptor filters the SOAP response message before it is sent by server. In a specific implementation of the invention, an XQuery engine would be suitable for building a filtering adaptor, with a query expression from metadata utilized by the adaptor.

The security adaptor is a WS-Security enabler which applies customized security policy on the response message. In order to achieve this runtime adaptability, the adaptor must understand the security requirement from the consumer by analyzing the security policy carried in the request message dynamically. Based on the understanding, the adaptor makes adequate encryption, signature on the response message.

The adaptor management service 214 is used to manage the adaptors. It has a local and remote interface. Local interface is a user interface. It is used for local administration. The service administrator can install, uninstall or upgrade an adaptor using the local interface. For each operation, an adaptor configuration file is updated. The remote interface is exposed as a Web Service. The consumer can query existing adaptors deployed on server side. When a query is received by the service, it will scan the configuration file and return the matched adaptor information. Based on the query, the consumer can know if the server supports specific server side mediation.

As mentioned, the client mediation engine 202 attaches mediation metadata in the request message. It does not change response message. The metadata to be attached is decided by the mediation policy 205. The policy could be defined by extending a WSDL document or creating a configuration file. Following is an example configuration file:

```
<mediations>
<service name="TrainService"
namespace="http://www.train.com/service"/>
<port name="TrainQueryPort"
namespace="http://www.train.com/service"/>
<operation name="GetAllTrains"
namespace="http://www.train.com/service"/>
<list>
<mediation name="transformation"
namespace="http://www.wsmediation.com/transformation">
<instylesheet url="http://www.example.com/in.xsl"/>
<outstylesheet url="http://www.example.com/out.xsl"/>
</mediation>
<mediation name="transformation"
namespace="http://www.wsmediation.com/transformation">
<expression url="http://www.example.com/xquery.exp"/>
</mediation>
</list>
</mediations>
```

In the configuration, service, port, operation element is used to indicate to which service the message will be attached with the metadata. The service element is mandatory. Port and operation element are optional. If no port and operation appears in policy, all messages sent to the service will be attached with the metadata. In the list element, a list of metadata is defined. This metadata will be changed slightly and attached to the request message.

The consumer can also attach metadata that the server may not understand. In this condition, the mediation element in the policy must contain a service Uniform Resource Locator (URL). That means the service according to the invention can make the required mediation. When the server mediation engine 208 finds such metadata, it will forward the message to the service.

Mediation policy can be defined manually or generated by policy assembler 215. The policy assembler 215 can query server side adaptor management service 214 and list supported adaptors. A consumer side application builder can utilize this information and establish metadata, such as a transformation template, filtering expression or a security policy.

Figure 3:
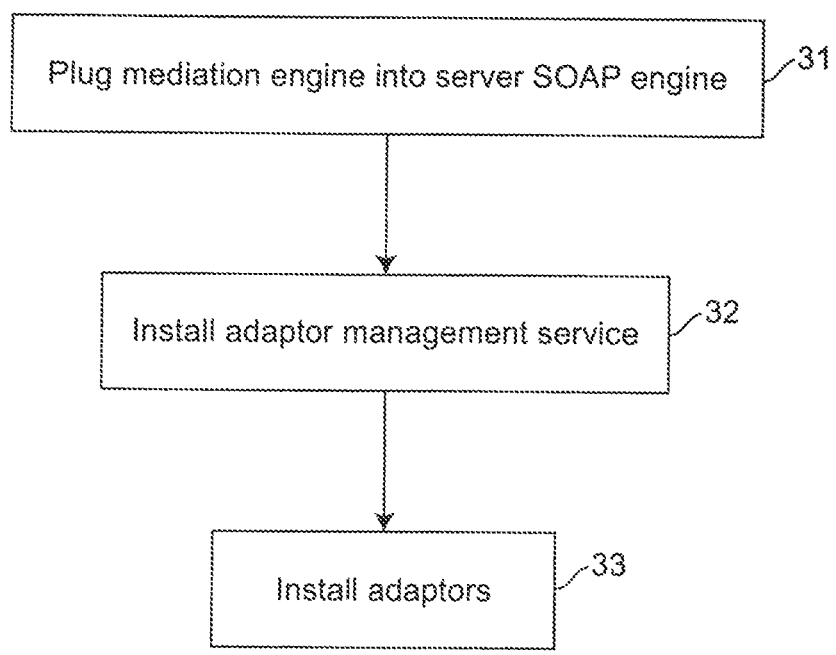
FIG. 3 is a flow diagram illustrating the logic of the workflow setup metadata driver mediation at the server side.

FIG. 3 shows the workflow of setup metadata driver mediation at the server side. The process begins at function block 31 by plugging the mediation engine 208 into the server SOAP engine 210. The adaptor management service 214 is then installed in function block 32. Finally, the adaptors, local adapters 212 and remote adaptors 213, are installed at function block 33.

Figure 4:
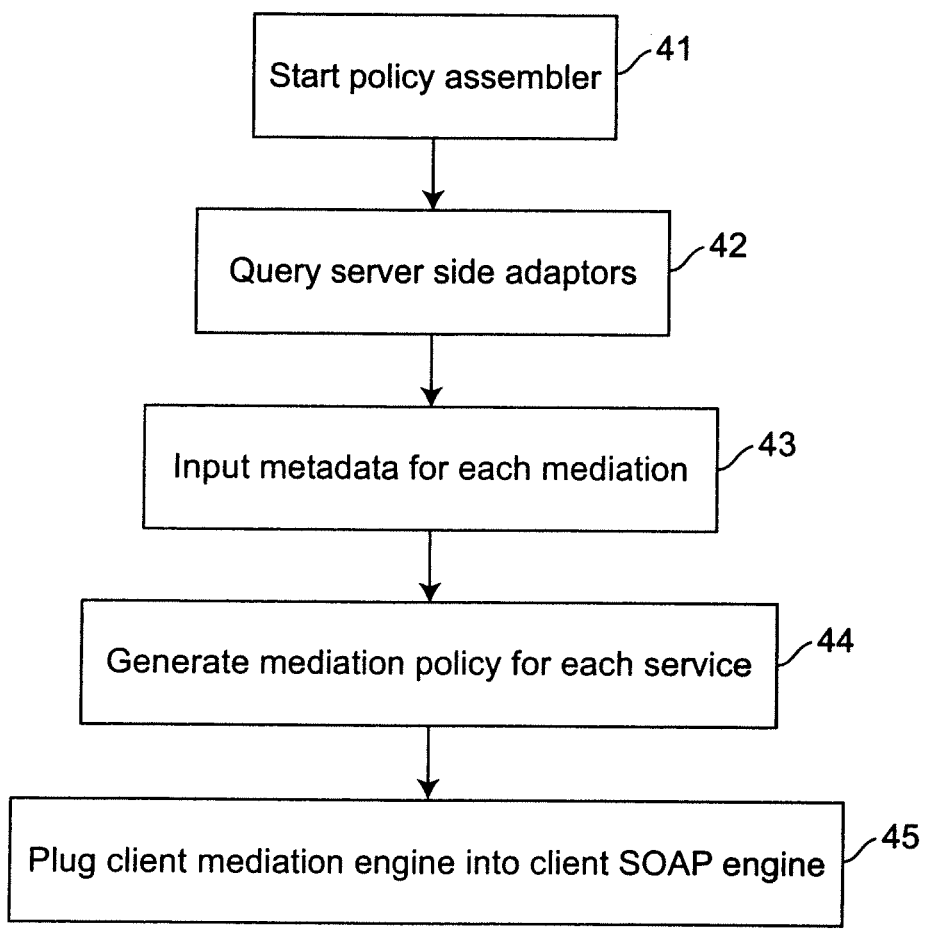
FIG. 4 is a flow diagram illustrating the logic of the workflow of setup metadata driver mediation at the client side.

FIG. 4 shows the workflow of set up metadata driver mediation at the client side. The process begins at function block 41 by starting the policy assembler 215. Next, the server side adaptors are queried at function block 42. The metadata for each mediation are input in function block 43. The mediation policy for each service is generated at function block 44. Finally, the client mediation engine 202 is plugged into the client SOAP engine 203 in function block 45.

Figure 5:
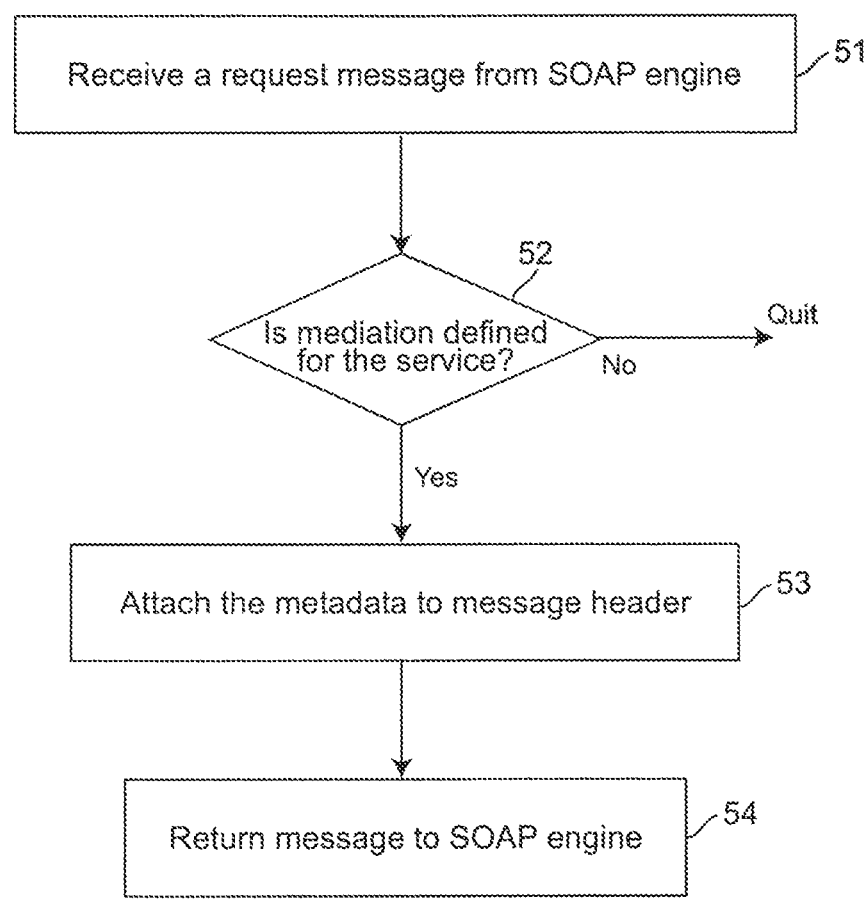
FIG. 5 is a flow diagram illustrating the logic of the workflow of attaching metadata in the client mediation engine.

FIG. 5 shows the workflow of attaching metadata in the client mediation engine 202. The process begins in function block 51 when a request message is received from the SOAP engine 203. A determination is made in decision block 52 as to whether mediation is defined for the service. If not, the process ends; otherwise, the metadata is attached to the message header in function block 53. Finally, the message is returned to the SOAP engine in function block 54.

Figure 6:
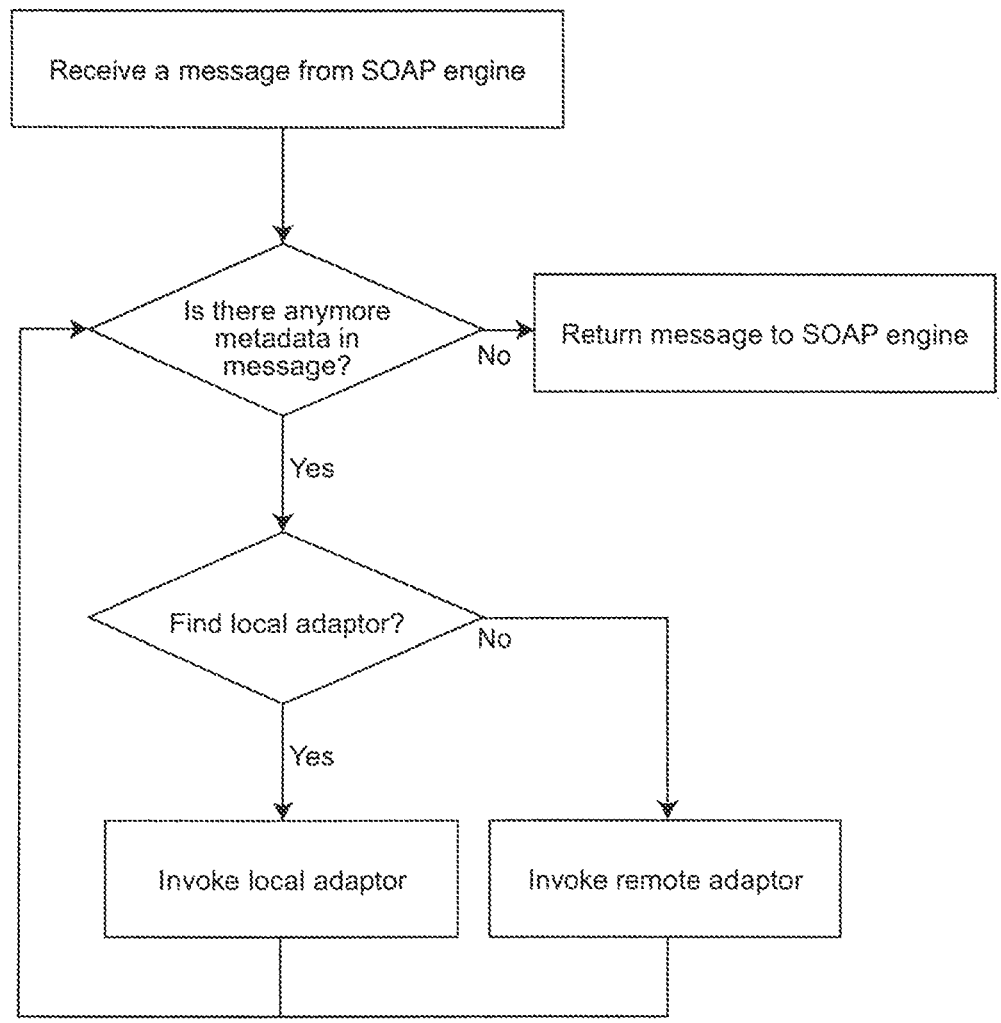
FIG. 6 is a flow diagram illustrating the logic of the workflow of mediation in the server mediation engine.

FIG. 6 shows the workflow of mediation in the server mediation engine 208. The process begins when a message is received from the SOAP engine 210 in function block 61. A determination is made in decision block 62 as to whether there is any more metadata in the message. If not, the message is returned to the SOAP engine 210 in function block 63; otherwise, a further determination is made in decision block 64 as to whether there is a local adapter. If so, a local adaptor 212 is invoked in function block 65, but if not, a remote adaptor 213 is invoked in function block 66. A return is made to decision block 62, and the process continues until there is no more metadata in the message.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer implemented method of attaching mediation metadata in a Simple Object Access Protocol (SOAP) message, the computer performing the steps comprising:
providing a client side mediation engine, the client side mediation engine generating customized metadata for controlling by the client implementation of a mediation defined for a service performed by a server, wherein said client and said server have different data schemes for said service and said customized metadata in accordance with said mediation provides for transformation between said different data schemes;
plugging the client side mediation engine into a client SOAP engine;
receiving by the client side mediation engine a request message for the service from the client SOAP engine;
attaching the customized metadata to a message header of a SOAP message, said customized metadata enabling customized invocation of said mediation by a server side mediation engine in response to said request for said service, the work of mediation customized for the client being thereby transferred from the client side to the server side; and returning the SOAP message to the client SOAP engine.

2. The method according to claim 1, wherein the SOAP message is mediated based on the metadata in the SOAP message further comprising the steps of:
providing the server side mediation engine, the server side mediation engine implementing said mediation defined for a service customized for the client in accordance with said metadata, the service being provided by said server;
plugging the server side mediation engine into a server SOAP engine;
receiving by the server side mediation engine a SOAP message from the server SOAP engine;
mapping said customized metadata with an appropriate adaptor; and
returning the SOAP message to the server SOAP engine.

3. The method according to claim 2, further comprising implementing by the server one or more adaptors in accordance with said customized metadata.

4. The method according to claim 3, further comprising implementing a transformation adaptor.

5. The method according to claim 3, further comprising implementing a filtering adaptor.

6. The method according to claim 3, further comprising implementing a security adaptor.

7. The method according to claim 3, further comprising the step of managing by the server side mediation engine said one or more mediation adaptors.

8. A hardware apparatus for inserting mediation metadata into a Simple Object Access Protocol (SOAP) message based on an existing Web Service client engine, said apparatus comprising:
a client side mediation engine plugged into a client SOAP engine, the client side mediation engine generating customized metadata for controlling by the client implementation of a mediation defined for a service performed by a server, wherein said client and said server have different data schemes for said service and said customized metadata in accordance with said mediation provides for transformation between said different data schemes; and
a mediation policy accessed by said client side mediation engine, and when the client side mediation engine receives a request message for the service from the client SOAP engine, the client side mediation engine attaches the customized metadata to a message header of a SOAP message, said customized metadata enabling customized invocation of said mediation policy by a server side mediation engine in response to said request for said service, the work of mediation customized for the client being thereby transferred from the client side to the server side, and returns the SOAP message to the client SOAP engine.

9. The apparatus of claim 8, wherein a SOAP message is mediated based on an existing Web Service engine, the apparatus further comprising:
a server side mediation engine plugged into a server SOAP engine, the server side mediation engine implementing said mediation defined for a service customized for the client in accordance with said metadata, the service being provided by said server; and
one or more adaptors accessed by said server side mediation engine, and when a SOAP message is received by the server side mediation engine from the server SOAP engine, said server side mediation engine maps said customized metadata in the SOAP message with an appropriate adaptor and returns the SOAP message to the server SOAP engine.

10. The apparatus of claim 9, further comprising an adaptor management service for managing said one or more adaptors.

11. The apparatus of claim 9, wherein one of said one or more adaptors is a transformation adaptor which performs a SOAP body transformation based on transformation metadata.

12. The apparatus of claim 9, wherein one of said one or more adaptors is a filtering adaptor which filters a SOAP response based on filtering metadata.

13. The apparatus of claim 9, wherein one of said one or more adaptors is a security adapter which applies a customized security policy to the SOAP message based on security metadata.

* * * * *